United States Patent [19]

Frances et al.

[11] Patent Number: 5,055,502

[45] Date of Patent: Oct. 8, 1991

[54] PREPARATION OF END-ALKOXYLATED DIORGANOPOLYSILOXANES

[75] Inventors: Jean-Marc Frances, Villeurbanne; Pierre-Michel Peccoux, Lyons, both of France

[73] Assignee: Rhone-Poulenc Chimie, Courbevoie, France

[21] Appl. No.: 385,143

[22] Filed: Jul. 26, 1989

[30] Foreign Application Priority Data

Jul. 29, 1988 [FR] France .................................. 88 10538

[51] Int. Cl.$^5$ ................................................. C08K 3/08
[52] U.S. Cl. ...................................... 524/780; 528/18; 528/19
[58] Field of Search ........................ 528/19, 18; 524/780

[56] References Cited

U.S. PATENT DOCUMENTS

| | | | |
|---|---|---|---|
| 3,122,522 | 2/1964 | Brown et al. | 528/15 |
| 3,161,614 | 12/1964 | Brown et al. | 528/15 |
| 3,542,901 | 11/1970 | Cooper et al. | 528/10 |
| 4,111,890 | 9/1978 | Getson et al. | 428/447 |
| 4,460,739 | 7/1984 | Ashby | 524/702 |
| 4,680,364 | 7/1987 | Lucas | 528/15 |

FOREIGN PATENT DOCUMENTS 2079745 1/1982 United Kingdom .

*Primary Examiner*—Melvyn I. Marquis
*Attorney, Agent, or Firm*—Burns, Doane, Swecker & Mathis

[57] ABSTRACT

Linear diorganopolysiloxanes having at least two alkoxy groups at each end of the polymer chain, well suited for formulation into single-component, storage-stable CVE polysiloxane compositions curable into elastomeric state in the presence of moisture, are prepared by functionalizing an alpha,omega-dihydroxydiorganopolysiloxane oil with a polyalkoxysilane, in the presence of a catalytically effective amount of a zinc complex of the formula:

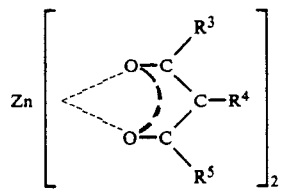

10 Claims, No Drawings

PREPARATION OF END-ALKOXYLATED DIORGANOPOLYSILOXANES

BACKGROUND OF THE INVENTION

1. Field of the Invention

The present invention relates to the preparation of diorganopolysiloxanes having alkoxy end groups (hereinafter designated FP: functionalized polymers), and to their use as one of the essential constituents of single-component organopolysiloxane compositions which are stable in storage in the absence of moisture and which are crosslinked into elastomeric state by atmospheric moisture at ambient temperature, hereinafter designated cold-vulcanizable elastomeric compositions (CVE).

2. Description of the Prior Art

Many processes for preparing diorganopolysiloxanes having alkoxy end groups are known to this art.

The processes described in U.S. Pat. Nos. 3,122,522, 3,161,614 and U.S. Pat. No. Re. 2,970 are especially representative. The processes described in these patents are not presently being carried out industrially because they are either too costly or result in the production of FPs of too poor a quality for their intended use as a base polymer for CVE compositions.

A notable advance in the art is reflected in U.S. Pat. No. 3,542,901, describing a process for the preparation of FP by reacting an alpha,omega-dihydroxydiorganopolysiloxane polymer, otherwise known as a diorganopolysiloxane having silanol end groups, with a polyalkoxysilane in the presence of a functionalization catalyst containing an amine functional group.

This process is undoubtedly effective, but it is very difficult to properly remove the amine, which may have a detrimental effect on the storage stability of the CVE composition in the presence of the condensation catalyst, which is a compound of a metal, generally tin.

Other catalysts may be employed, such as, for example, an organic titanium derivative (U.S. Pat. No. 4,111,890), an alkoxy aluminum chelate (British Patent GB-A-2,144,758) and an N,N-disubstituted hydroxylamine (French Patent Fr-A-2,508,467). These catalysts can present the disadvantage of being relatively inefficient or adversely effecting on the storage stability of the CVE compositions.

Another process for making FPs entails employing mixed silanes which contain, in addition to alkoxy groups, a hydrolyzable group such as an amido, amino, carbamate, oxime or similar group, optionally in the presence of a known functionalization catalyst and of a polyalkoxysilane.

Processes of this type are particularly described in U.S. Pat. Nos. 3,697,568 and 3,896,079, and in EP-A-69,256.

These processes are efficient, but require the use of costly mixed silanes Furthermore, the organic products resulting from the groups which can be hydrolyzed after reaction can have a detrimental effect on the CVE composition (in this regard, see pages 4 and 5 of French Patent FR-A-2,543,562).

SUMMARY OF THE INVENTION

Accordingly, a major object of the present invention is the provision of a functionalization catalyst which is efficient and does not present detrimental secondary effects in the CVE compositions into which it is incorporated, even in the event that it has not previously been separated or removed from the FPs produced therefrom.

Briefly, the present invention features a process for the preparation of a linear diorganopolysiloxane having at least two alkoxy groups at each end of the polymer chain, comprising reacting at least one linear diorganopolysiloxane having a hydroxyl group at each end of the polymer chain with at least one polyalkoxysilane of the formula:

$$(R^1)_a(OR^6)_b Si(OR^2)_{4-a-b} \tag{3}$$

in the presence of a catalytically effective amount of a zinc complex of the formula:

$$ZnQ_2 \tag{4}$$

in which a is 0 or 1; b is 0, 1 or 2; $R^1$ is a substituted or unsubstituted, saturated or unsaturated $C_1$–$C_{13}$ monovalent hydrocarbon radical; $R^2$ is an aliphatic organic radical containing from 1 to 8 carbon atoms, preferably alkyl radicals, alkylether radicals, alkyl ester radicals, alkyl ketone radicals, alkylcyano radicals and aralkyl radicals containing from 7 to 13 carbon atoms; $R^6$ is a radical $R^2$ or a like radical but having fewer carbon atoms than $R^2$; and Q is a monovalent anion of the formula:

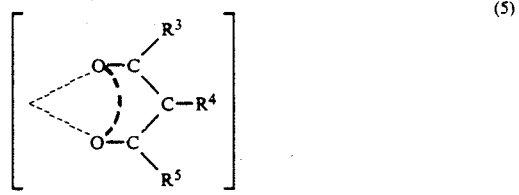

(5)

in which $R^3$ and $R^5$, which may be identical or different, are each a hydrogen atom, a $C_1$–$C_{12}$ alkyl radical or halogenated such radical, a $C_2$–$C_8$ alkenyl radical or halogenated such radical, a $C_4$–$C_8$ cycloalkyl radical or halogenated such radical, a $C_6$–$C_{10}$ monocuclear aryl radical or halogenated such radical, a $C_7$–$C_{12}$ mononuclear arylalkyl radical or halogenated such radical, a $C_1$–$C_5$ alkoxy radical or halogenated such radical, a $C_1$–$C_6$ acyloxy radical, a cyanoalkyl radical having a $C_1$–$C_4$ alkyl moiety, a cyanoalkoxy radical having a $C_1$–$C_5$ alkoxy moiety; and $R^4$ is a hydrogen atom, a $C_1$–$C_8$ hydrocarbon radical or halogenated such radical, preferably an alkyl, alkenyl or mononuclear aryl radical, with the proviso that $R^4$ and $R^5$ may together form a $C_5$–$C_{12}$ cyclic hydrocarbon radical or a substituted such radical bearing one or more chloro, nitro and/or cyano substituents.

The present invention also features the incorporation of such linear diorganopolysiloxanes containing at least two alkoxy groups at each end of the polymer chains, produced according to the process of the invention, into single-component polysiloxane compositions which are stable in storage in the absence of moisture and which crosslink into elastomeric state in the presence of moisture.

DETAILED DESCRIPTION OF THE PREFERRED EMBODIMENTS OF THE INVENTION

More particularly according to the present invention, the subject diorganosiloxanes having at least two alkoxy groups at each end of the polymer chain advantageously have the formula:

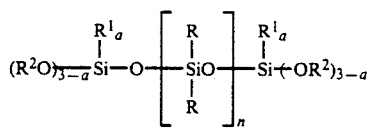

and the starting material diorganopolysiloxane having a hydroxyl group at each end of its polymer chain advantageously has the formula:

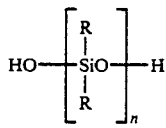

in which $R^1$ and $R^2$ are as defined above in respect of the silane of formula (3); the radicals R, which may be identical or different, are each a monovalent hydrocarbon radical containing from 1 to 10 carbon atoms, optionally substituted by halogen atoms or cyano groups and preferably methyl, phenyl, vinyl and 3,3,3-trifluoropropyl radicals; a is 0 or 1; and n is a number of sufficient value to impart to the polymers of formula (1) and (2) a viscosity of 25 to 1,000,000 mPa.s at 25° C., with the proviso that the polysiloxane of formula (1) may have an average formula in which the value of D is larger or smaller than the value of n of the diorganopolysiloxane (2) which is reacted with the silane of formula (3).

Exemplary radicals R referred to above include:

(i) alkyl and haloalkyl radicals containing from to 10 carbon atoms, such as methyl, ethyl, propyl, isopropyl, butyl, pentyl, hexyl, 2-ethylhexyl, octyl, decyl, 3,3,3-trifluoropropyl, 4,4,4-trifluorobutyl and 4,4,4,3,3-pentafluorobutyl radicals;

(ii) cycloalkyl and halocycloalkyl radicals containing from 1 to 10 carbon atoms, such as cyclopentyl, cyclohexyl, methylcyclohexyl, propylcyclohexyl, 2,3-difluorocyclobutyl and 3,4-difluoro-5-methylcycloheptyl radicals;

(iii) alkenyl radicals containing from 2 to 4 carbon atoms, such as vinyl, allyl and 2-butenyl radicals;

(iv) mononuclear aryl and haloaryl radicals containing from 6 to 10 carbon atoms, such as phenyl, tolyl, xylyl, chlorophenyl, dichlorophenyl and trichlorophenyl radicals; and (v) cyanoalkyl radicals, the alkyl moieties of which contain from 2 to 3 carbon atoms, such as β-cyanoethyl and γ-cyanopropyl radicals.

Exemplary of the $R_2SiO$ recurring units comprising the alpha,omega-dihydroxydiorganopolysiloxane of formula (2), representative are:

$(CH_3)_2SiO$, $CH_3(CH_2=CH)SiO$ $CH_3(C_6H_5)SiO$ $(C_6H_5)_2SiO$ $CF_3CH_2CH_2(CH_3)SiO$ $NC-CH_2CH_2(CH_3)SiO$ $NC-CH(CH_3)CH_2(CH_2=CH)SiO$ $NC-CH_2CH_2CH_2(C_6H_5)SiO$

It will be appreciated that the polymer of formula (2) employed in the process according to the present invention may comprise a mixture of alpha,omega-dihydroxydiorganopolysiloxane polymers which differ from each other in molecular weight and/or the nature of the groups bonded to the silicon atoms. It will also be appreciated that the polymer of formula (2) may optionally comprise monoorganosiloxy $RSiO_{1.5}$ units and/or $SiO_2$ units, in a proportion of not more than 2% relative to the number of diorganosiloxy $R_2SiO$ units.

These alpha,omega-dihydroxydiorganopolysiloxane polymers are commercially available; moreover, they can easily be produced according to techniques which are now well known to this art.

Exemplary of the polyalkoxysilanes of formula $(R^1)_a(OR^6)_bSi(OR^2)_{4-a-b}$ which may be employed in the process according to the present invention, especially representative are:

$Si(OCH_3)_4$ $Si(OCH_2CH_3)_4$ $Si(OCH_2CH_2CH_3)_4$ $(CH_3O)_3SiCH_3$ $(C_2H_5O)_3SiCH_3$ $(CH_3O)_3SiCH=CH_2$ $(C_2H_5O)_3SiCH=CH_2$ $(CH_3O)_3SiCH_2-CH=CH_2$ $(CH_3O)_3Si[CH_2-(CH_3)C=CH_2]$ $(C_2H_5O)_3Si(OCH_3)$ $Si(OCH_2-CH_2-OCH_3)_4$ $CH_3Si(OCH_2-CH_2-OCH_3)_3$ $CH_2=CHSi(OCH_2CH_2OCH_3)_3$ $C_6H_5Si(OCH_3)_3$ $C_6H_5Si(OCH_2-CH_2-OCH_3)_3$

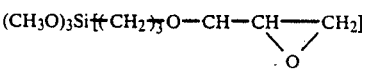

$(CH_3O)_3Si-[(CH_2)_2-CH_2Cl]$ $(CH_3O)_3Si\text{\textlbrackdbl}(CH_2)_3OOC(CH_3CH_3)C=CH_2]$

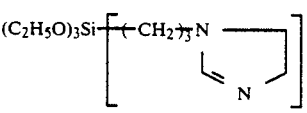

$(C_2H_5O)_3Si[(CH_2)_2CH_2Cl]$ $(CH_3O)_3Si[(CH_2)_3NH_2]$ $(C_2H_5O)_3Si\text{-}(CH_2)_3\text{-}NH_2]$ $(CH_3O)_3Si\text{-}(CH_2)_3\text{-}NH(CH_2)_2\text{-}NH_2]$ $(C_2H_5O)_3Si\text{-}(CH_2)_3\text{-}NH(CH_2)_2\text{-}NH_2]$ $(CH_3O)_3\text{-}Si(CH_2)_3\text{-}SH$ The most commonly used polyalkoxysilanes are: $Si(OCH_3)_4$, $Si(OC_2H_5)_4$, $CH_3Si(OCH_3)_3$, $CH_3Si(OC_2H_5)_3$ and $(C_2H_5O)_3Si(OCH_3)$.

With regard to the catalyst of formula (4), including the anion of formula (5), especially representative $R^3$ and $R^5$ radicals comprising the anion Q are:

(i) $C_1$–$C_{12}$ alkyl radicals or halogenated such radicals, such as methyl, ethyl, propyl, isopropyl, butyl, isobutyl, secondary butyl, tert-butyl, pentyl, hexyl, heptyl, 2-ethylhexyl, octyl, decyl, dodecyl, chloromethyl and 2,5-dichloroethyl radicals;

(ii) $C_2$–$C_8$ alkenyl radicals or halogenated such radicals, such as vinyl, allyl, methallyl, 2-butenyl, 2-pentenyl, 3-octenyl and 5-fluoro-2-pentenyl radicals;

(iii) $C_4$–$C_8$ cycloalkyl radicals or halogenated such radicals, such as cyclopentyl, cyclohexyl, methylcyclohexyl, cyclooctyl, 3,4-dichlorocyclohexyl and 2,6-dibromocycloheptyl radicals;

(iv) $C_6$–$C_{10}$ mononuclear aryl radicals or halogenated such radicals, such as phenyl, tolyl, xylyl, cumyl, chlorophenyl, dichlorophenyl, trichlorophenyl, difluorophenyl and trifluoromethylphenyl radicals;

(v) $C_7$–$C_{12}$ mononuclear arylalkyl radicals or halogenated such radicals, such as benzyl, phenylethyl, phenylpropyl and trifluoromethylphenylethyl radicals;

(vi) $C_1$–$C_5$ alkoxy radicals or halogenated such radicals, such as methoxy, ethoxy, propoxy, butoxy, pentoxy, chloromethoxy, dichloroethoxy and dichloropentoxy radicals; and (vii) $C_1$–$C_6$ acyloxy radicals, such as acetoxy, propanoyloxy, butanoyloxy, pentanoyloxy and hexanoyloxy radicals.

$R^3$ and $R^5$ may additionally be hydrogen atoms, cyanoalkyl radicals which have a $C_2$–$C_4$ alkyl moiety, cyanoalkoxy radicals which have a $C_1$–$C_5$ alkoxy moiety and $C_1$–$C_{12}$ organohydrocarbon radicals.

Exemplary cyanoalkyl radicals are cyanoethyl, cyanopropyl and cyanobutyl radicals, and exemplary cyanoalkoxy radicals are cyanoethoxy and cyanopropoxy radicals.

$R^4$ is a hydrogen atom, or a $C_1$–$C_8$ hydrocarbon radicals or halogenated such radical.

$R^4$ is preferably an alkyl radical or halogenated such radical, such as methyl, ethyl, propyl, butyl, hexyl and octyl radicals, or a mononuclear aryl radical or halogenated such radical, such as phenyl, tolyl, chlorophenyl and dichlorophenyl radicals.

In addition, $R^4$ and $R^5$ may together form a $C_5$–$C_{12}$ cyclic hydrocarbon radical, or substituted such radical bearing one or more chloro, nitro and/or cyano substituents. Exemplary of these cyclic hydrocarbon radicals are those, in particular, including an aromatic (for example benzene) ring, or those of the formulae

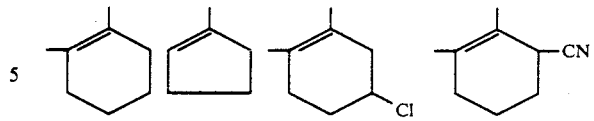

The catalysts of formula (4 and 5) for carrying out the process according to the present invention are described in the literature, together with various techniques for the preparation thereof, especially in the test *Metal Beta-Diketonates and Allied Derivatives* by Mehrotra, Bohra and Gaur, published by Academic Press in 1978.

Exemplary of the catalysts corresponding to formula (4), more particularly representative are:

(i) zinc bisacetylacetonate (where $R^3$ and $R^5$ are $CH_3$ groups and $R^4$ a hydrogen atom, in formula 5);

(ii) bis(1,3-diphenyl-1,3-propanedionate)zinc, also designated zinc dibenzoylmethanate (where $R^3$ and $R^5$ are phenyl —$C_6H_5$ groups and $R^4$ is a hydrogen atom in formula 5);

(iii) bis(1-phenyl-5-methyl-1,3-hexanedionato)zinc, also designated (1-benzoyl-4-methyl-2-pentanonato)-zinc, (where $R^3$ is a phenyl —$C_6H_5$ group, $R^4$ is a hydrogen atom and $R^5$ is the isobutyl —$CH_2$—$CH(CH_3)$—$CH_3$ group, in formula (5)).

In the process according to the present invention, from 1 to 5 moles, preferably from 2 to 4.8 moles of polyalkoxysilane of formula (3) are typically employed per one mole of silanol ($\equiv$SiOH) group of the polydiorganosiloxane of formula (2) having a hydroxyl group at each end of its polymer chain.

By "catalytically effective amount" of the zinc complex of formula (4) is typically intended from 0.001 to 0.5, preferably from 0.02 to 0.1 moles of this complex, relative to 1 mole of silanol ($\equiv$SiOH) groups of the polyrelative diorganosiloxane of formula (2).

The process according to the present invention may be carried out at a temperature of from 20° to 140° C., preferably from 40° to 100° C. The reaction time is proportionately shorter the higher the temperature, and it is generally less than 2 hours at a temperature of 80° C. The process is carried out with protection against moisture, for example in a closed reactor to which a vacuum has been applied, and in which the removed air has been replaced with a dry gas such as nitrogen.

The present invention also features incorporating the diorganopolysiloxanes having at least two alkoxy groups at each end of the polymer chain, produced according to the above process, into single-component polysiloxane compositions which are stable in storage in the absence of moisture and which crosslink into an elastomer in the presence of moisture.

These compositions are formulated by adding (by weight) to 100 parts of the functionalized polymer of formula (1) produced according to the process of the invention:

(a) 0 to 250 parts of inorganic filler material;

(b) 0 to 20 parts, preferably 0 to 10 parts, of at least one additive selected from among the aminoorganosilanes, aminoorganopolysiloxanes and guanidinoorganosilanes simultaneously containing, per molecule:

(i) at least one $C_3$–$C_{15}$ organohydrocarbon radical bonded by a SiC bond to the silicon atom and substituted by at least one amino radical or one guanidino radical; and (ii) at least one $C_1$–$C_5$ alkoxy radical or a $C_3$–$C_6$ alkoxyalkylenoxy radical: and (c) a catalytically effective amount of a condensation catalyst.

By "catalytically effective amount" of a condensation catalyst is typically intended, for example, from 0.001 to 1 part by weight of at least one compound of a metal generally selected from among tin, titanium, zirconium, and mixtures thereof.

The condensation catalyst employed may be tin monocarboxylates and dicarboxylates, such as tin 2-ethylhexanoate, dibutyltin dilaurate or a dibutyltin diacetate (see the Noll text, *Chemistry and Technology of Silicones*, 2nd Edition, page 337, Academic Press (1968).

Hexacoordinated chelates of tin of valency IV, such as those described in European Patent Application EP-A-147,323 and U.S. Pat. No. 4,517,337, for example are particularly suitable.

Also preferred are the condensation catalysts which are a mixture of a diorganotin bis(β-diketonate) with a organic derivative of tin, also of valency IV, but devoid of a β-diketonato functional group, and containing at least one tin atom, each tin atom bearing two organic radicals bonded via an Sn—C bond, the other two valencies being satisfied by radicals selected from among organic or inorganic radicals bonded by an SnO or SnS bond, by halogen atoms by hydroxyl groups and by oxygen atoms.

These organotin derivatives of valency IV which are devoid of any β-diketonato functional groups may be, in particular, tin salts corresponding to the formulae:

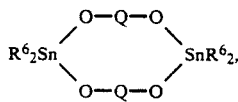

in which $R^6$ is a $C_1$–$C_{20}$ hydrocarbon radical or a halogenated such radical; A is an organic or inorganic radical bonded to the tin atom via an Sn—O or Sn—S bond, or a halogen atom; and Q is a $C_2$–$C_{10}$ alkylene radical.

A is advantageously:

(i) a monocarboxylate radical of the formula $R^7COO$, in which $R^7$ is a $C_1$–$C_{20}$ hydrocarbon radical or a halogenated such radical;

(ii) a dicarboxylate radical of the formula

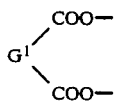

bonded to the same single tin atom or to two tin atoms, constituting the two formulae:

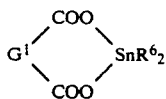

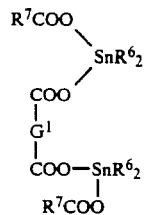

in which $G^1$ is a $C_1$–$C_{15}$ divalent hydrocarbon radical and $R^7$ is as defined under (i); and (iii) a dicarboxylate radical of the formula $R^7OCOG^1COO$ in which $R^7$ and $G^1$ are as defined above under (i) and (ii), respectively.

The above tin salts are well known to this art and are described, in particular, in the aforementioned text by Noll, U.S. Pat. Nos. 3,186,963 and 3,862,919, Belgian Patent 842,305 and British Patent GB-A-1,289,900, hereby incorporated by reference.

The inorganic fillers are employed in a proportion of 0 to 250 parts, preferably 5 to 200 parts, per 100 parts of FP of formula (1).

These fillers may be in the form of very finely divided materials whose mean particle diameter is less than 0.1 micrometer. These fillers include pyrogenic silicas and precipitated silicas; their BET specific surface is generally greater than 40 m²/g.

These fillers may also be in the form of more coarsely divided materials, having a mean particle diameter greater than 0.1 micrometers. Exemplary of such fillers are ground quartz, diatomaceous silicas, calcium carbonate, calcined clay, titanium dioxide of the rutile type, iron, zinc, chromium, zirconium and magnesium oxides, the various forms of alumina and magnesium oxides, the various forms of alumina (hydrated or otherwise), boron nitride, lithopone, barium metaborate, barium sulfate and ballotini; their specific surface area is generally below 30 m²/g.

These fillers may also have been surface-modified by treatment with the various organosilicon compounds which are usually employed for this purpose. Thus, such organosilicon compounds may be organochlorosilanes, diorganocyclopolysiloxanes, hexaorganodisiloxanes, hexaorganodisilazanes or diorganocyclopolysiloxanes (French Patent FR-A-1,126,884, FR-A-1,136,885, FR-A-1,236,505; British Patent GB-A-1,024,234). In the majority of cases, the treated fillers include from 3% to 30% of their weight of organosilicon compounds.

The fillers may comprise a mixture of a number of types of fillers of different particle size; thus, for example, they may include 30% to 70% of finely divided silicas having a BET specific surface area greater than 40 m²g and 70% to 30% of more coarsely divided silicas having a specific surface area below 30 m²/g.

In order to especially improve the adhesion of the CVEs, the compositions according to the invention may optionally additionally contain from 0 to 20 parts, preferably from 1 to 15 parts, of at least one additive selected from among the aminoorganosilanes, aminoorganopolysiloxanes and guanidinoorganosilanes simultaneously containing, per molecule:

(i) at least one $C_3$–$C_{15}$ organohydrocarbon radical bonded by an SiC bond to the silicon atom and substituted by at least one amino radical or one guanidino radical; and (ii) at least one $C_1$–$C_5$ alkoxy radical or one $C_3$–$C_6$ alkoxyalkylenoxy radical.

These additives and their methods of use are described, in particular, in U.S. Pat. Nos. 2,754,311, 2,832,754, 2,930,809, 2,971,864, 3,341,563, 3,686,375 and 4,180,642.

Particularly exemplary such additives are the silanes of the formulae:

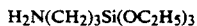

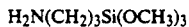

Particularly suitable adhesion promoters are the silanes of formula:

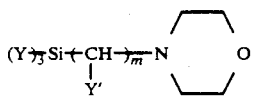

in which y is an alkyl or alkoxy radical containing from 1 to 4 carbon atoms, inclusive, at least two of the radicals Y being alkoxy radicals, the radicals Y', which may be identical or different, are each a hydrogen atom or an alkyl radical containing from 1 to 3 carbon atoms, inclusive, and m is an integer ranging from 3 to 10, inclusive.

Exemplary such silanes are:

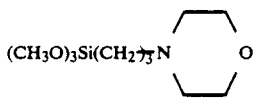

gamma-morpholinopropyltrimethoxysilane, and

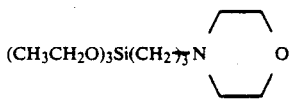

gamma-morpholinopropyltriethoxysilane.

These compounds and a process for the preparation thereof are described by John L. Speier, in *J. Org. Chem.* vol. 36, no. 21, page 3120 (1971).

In order to further illustrate the present invention and the advantages thereof, the following specific examples are given, it being understood that same are intended only as illustrative and in nowise limitative.

EXAMPLE 1

20 g (0.025 mole) of a dimethylpolysiloxane having a hydroxyl group at the end of the polymer chain, containing 4.25% by weight of hydroxyl radicals, were introduced into a reactor. This polysiloxane had the average formula

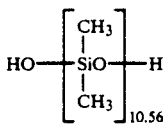

After stirring for 5 minutes under a reduced pressure of 5 to 10 mm Hg at 20° C., the vacuum was broken and nitrogen was introduced. The temperature was increased progressively up to 80° C. over 30 minutes, under stirring and under a nitrogen atmosphere. When the temperature had stabilized at 80° C., a mixture of 14 grams (0.103 moles) of methyltrimethoxysilane and 0.263 g of Zn bisacetylacetonate (~0.001 mole) was introduced. After one hour of stirring at 80° C., the reactor was subjected to a vacuum of 1 mm Hg and maintained for 1 hour at 80° C. before the reaction mixture was permitted to return to ambient temperature.

$^{29}$Si NMR analysis of the resulting dimethylpolysiloxane made it possible to determine that 97.8% of the remaining reaction mass corresponded to an oil having the average formula:

EXAMPLE 2

The procedure of Example 1 was repeated in the same manner and using the same amounts of the same materials, except that the organozinc catalyst was bis(1,3-diphenyl-1,3-propanedionato)zinc. 0.001 mole (0.51 g) thereof was employed.

Analysis of the resulting dimethylpolysiloxane, by $^{29}$Si NMR, showed that an oil having the following average formula was produced:

EXAMPLE 3

The procedure of Example 1 was repeated, except that:

(i) 9.63 g of methyltrimethoxysilane ($\approx$0.071 mole) were employed;

(ii) 0.47 g of bis(1-phenyl-5-methyl-1,3-hexanedionato)zinc, namely, 1 millimole, was employed; and (iii) no devolatilization operation was carried out upon completion of the reaction.

The analysis of the resulting dimethylpolysiloxane, by $^{29}$Si NMR, showed that 93% of an oil having the following average formula was produced:

EXAMPLE 4

The procedure of Example 2 was repeated, except that:

(i) 32 g (0.23 mole) of methyltrimethoxysilane were introduced; and (ii) the excess silane was not removed, under reduced pressure, upon completion of the reaction.

The molar percentages, expressed in moles of silicon and determined by $^{29}$Si NMR analysis, were the following:

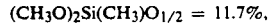

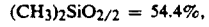

$(CH_3)_2Si\begin{smallmatrix}OH\\O_{1/2}\end{smallmatrix} = 0.4\%,$ $(CH_3O)Si(CH_3)_2O_{1/2} = 0.3\%.$ An oil having the following average formula was thus produced:

$(CH_3O)_2(CH_3)Si-O+Si(CH_3)_2O+_{10.8}Si(CH_3)(OCH_3)_2$ which included an excess of unreacted methyltrimethoxysilane.

EXAMPLE 5

The operation is carried out in the same way as the procedure of Example 4 was repeated, except that 0.047 g (0.1 millimole) of bis(1-phenyl-5-methyl-1,3-hexanedionato)zinc was employed.

The molar percentages, expressed in moles of silicon and determined by $^{29}Si$ NMR analysis, were the following:

$(CH_3O)_2(CH_3)SiO_{1/2} = 12\%,$ $(CH_3)_2SiO_{2/2} = 56.3\%.$ $(CH_3O)_3Si(CH_3) = 31.1\%,$ $(CH_3)_2\underset{OH}{Si}O_{1/2} = 0.2\%,$ $(CH_3O)Si(CH_3)_2O_{1/2} = 0.2\%.$ An oil having the following average formula was thus produced:

$(CH_3O)_2(CH_3)Si-O+Si(CH_3)_2-O+_{11.3}Si(CH_3)(OCH_3)_2$ which included an excess of unreacted methyltrimethoxysilane.

EXAMPLE 6

The procedure of Example 1 was repeated in the same manner and using the same amounts of materials, except that 0.696 g (1 millimole) of tris(1,3-phenyl-1,3-propanedionato)aluminum was employed.

The product obtained after devolatilization, determined by $^{29}Si$ NMR analysis, corresponded to the starting material oil, hydroxylated at each end of the polymer chain. Therefore, no functionalization of this starting oil had been carried out.

EXAMPLE 7

The procedure of Example 1 was repeated in the same manner and using the same amounts of reactants, except that 0.636 g (1 millimole) of tris(1-phenyl-5-methyl-1,3-hexanedionato)aluminum was employed.

The product obtained after devolatilization, determined by $^{29}Si$ NMR analysis, showed the following (Me=CH_3 below):

$Me_2(OMe)SiO_{\frac{1}{2}} = 6.7\%,$ $Me_2SiO_{2/2} = 79.1\%,$ $(MeO)_2MeSiO_{\frac{1}{2}} = 9.5\%$ $(MeO)Me_2SiO_{\frac{1}{2}} = 4.1\%$ The functionalization was therefore only partial, the principal impediment being the formation of $Me_2(OMe)SiO_{\frac{1}{2}}$ chain-blocking groups.

EXAMPLE 8

The procedure of Example 1 was repeated, again using 20 g (0.025 mole) of a polydimethylsiloxane containing 4.25% by weight of hydroxyl radicals, except that a mixture of 14.7 g ($\approx$0.071 mole) of tetraethoxysilane Si(OEt)$_4$ and 0.51 g (1 millimole) of bis(1,3-diphenyl-1,3-propanedione)zinc was employed.

After 1 hour of stirring at 80° C., the reaction mixture was cooled and analyzed by $^{29}Si$ NMR.

The degree of conversion of the $Me_2(OH)SiO_{\frac{1}{2}}$ units was 91%, with formation of the end units:

$-O-\underset{\underset{Me}{|}}{\overset{\overset{Me}{|}}{Si}}-OSi(OEt)_3 = 57\%$ $-O-SiMe_2OSi(OEt)_2O_{1/2} = 11\%$ $-O-Si(Me_2)OSi(OEt)-O_{2/2} = 8\%$

EXAMPLE 9

The procedure of Example 8 was repeated, except that the catalyst introduced was 0.47 g (1 millimole) of bis(1-phenyl-5-methyl-1,3-hexanedionato)zinc.

The reaction mixture was then analyzed by $^{29}Si$ NMR. The degree of conversion of the end $-O-SiMe_2(OH)$ units reached 2.5%, with formation of 70% of $-OSiMe_2OSi(OEt)_3$ and 13.4% of $-OSiMe_2-O-Si(OEt)_2O_{\frac{1}{2}}$ end units.

EXAMPLE 10

The procedure of Example 8 was repeated, except that the catalyst employed was 1 millimole of tris(1,3-phenyl-1,3-propanedionato)aluminum. The product obtained was analyzed by $^{29}Si$ NMR.

The degree of conversion of the $Me_2Si(OH)O_{\frac{1}{2}}$ was zero.

EXAMPLE 11

The procedure of Example 8 was repeated, except that the catalyst introduced was 1 millimile of tris(1-phenyl-5-methyl-1,3-hexanedionato)aluminum. The product obtained was analyzed by $^{29}Si$ NMR.

The degree of conversion of the $Me_2Si(OH)O_{\frac{1}{2}}$ units was 100%.

The following were determined in the reaction mass (molar percentages expressed in moles of silicon):

$Me_2Si(OEt)O_{\frac{1}{2}} = 6\%,$ $Me_2SiO_{2/2} = 81\%,$ $(EtO)_3SiO_{\frac{1}{2}} = 2.5\%$ $Si(OEt)_4 = 0.3\%,$ $Si(OEt)_2O_{2/2} = 4\%.$ The functionalization was partial in this case, the principal impediment being the abundant formation of Me$_2$Si(OEt)O$_{\frac{1}{2}}$ chain-blocking units.

EXAMPLE 12

1000 g (corresponding to 50 millimoles of OH groups) of a polydimethylsiloxane oil having a viscosity of 20,000 mPa.s at 25° C., with silanol (—OSiMe$_2$OH end groups, containing 850 ppm (parts per million) of hydroxyl radicals bonded to silicon, were stirred for 6 minutes at 20° C. under reduced pressure (1 mm Hg), and the vacuum was then broken by introducing nitrogen.

The temperature was progressively increased until it reached 80° C. over 30 minutes, with stirring and under a nitrogen atmosphere. When the temperature had stabilized at 80° C., 49.4 g (237.5 millimoles) of tetraethoxysilane (also termed ethyl silicate) Si(OC$_2$H$_5$)$_4$ and 1.18 g (2.5 millimoles) of bis(1-phenyl-5-methyl-1,3-hexanedionato)zinc were introduced.

After 1 hour of stirring at 80° C., the reaction mixture was cooled.

The viscosity of the mixture, consisting essentially of the functionalized oil, was 31,700 mPa.s at 25° C.

EXAMPLE 13

800 parts of the reaction mass of Example 12 were introduced into a glass reactor fitted with a stirring system, a nitrogen inlet, a condenser and a temperature measuring system, and were heated to 80° C. until the temperature had stabilized (1 hour), and 24 grams of an aminosilane of the formula H$_2$N(CH$_2$)$_2$NH(CH$_2$)$_3$Si(OCH)$_3$ were then introduced into the reactor. After being stirred for another quarter of an hour at 80° C., 400 mg of dibutyltin bis(acetylacetonate) were introduced into the reactor and stirring was continued for 15 minutes at 80° C. Lastly, 64 grams of silica of Aerosil 150 type (a pyrogenic silica whose specific surface area was 150 m$^2$/g, marketed by Degussa) were introduced into the reactor over 6 minutes and were mixed homogeneously with the reaction mass. Heating was terminated and the mixture was cooled to 25° C. The reaction mass was degassed for 5 minutes under a vacuum of approximately 1 millimeter of mercury.

The composition obtained (the resin) was poured into two sealed aluminum tubes. One of the tubes was maintained for 48 hours at 20° C., while the other was subjected, for 48 hours, to a temperature of 100° C., which was equivalent to a storage period of 1 month at 20° C.

The contents of each tube were spread out onto a stainless steel plate clad with silicone-coated paper, such as to provide a layer 2 mm in thickness with each composition.

Each elastomer film, produced after 24, 48 or 72 hours of crosslinking, was removed (demolded) and its tensile properties were measured at a temperature of 20° C.

The results are reported in the Table below.

EXAMPLES 14–18

The procedure of Example 12 was repeated for the functionalization of the oil, while modifying the nature of the functionalization catalyst or the nature of the alkoxysilane, without modifying the molar ratios of each of the constituents.

The procedure described in Example 13 was then repeated in order to prepare the resin corresponding to the reaction mass produced.

The results are reported in the Table below.

It was found that aluminum chelates were inefficient for producing compositions exhibiting good tensile properties.

In the Table which follows:

Q$^1$ = C$_6$H$_5$—CO—CH—CO—CH$_2$—CH(CH$_3$)—CH$_3$;

Q$^2$ = C$_6$H$_5$—CO—CH—CO—C$_6$H$_5$—;

T$_{20}$ = Tube maintained for 48 hours at 20° C.;

T$_{100}$ = Tube maintained for 48 hours at 100° C.;

SAH = Shore A hardness, evaluated according to ASTM standard D 2240;

TS = Tensile strength in MPa (megapascals) measured according to AFNOR standard T 46 002, corresponding to ASTM standard D 412;

EB = Elongation at break in %, measured according to AFNOR standard T 46 002;

Skin time (min) = Time, expressed in minutes, for skin formation;

Pourability = Boeing test;

NM = Not measurable.

TABLE

| | Example 13 MeSi(OMe)$_3$ ZnQ$^1$$_2$ | Example 14 MeSi(OMe)$_3$ ZnQ$^2$$_2$ | Example 15 Si(OEt)$_4$ ZnQ$^1$$_2$ | Example 16 Si(OEt)$_4$ ZnQ$^2$$_2$ | Example 17 MeSi(OMe)$_3$ AlQ$^1$$_3$ | Example 18 Si(OEt)$_4$ AlQ$^1$$_3$ |
| --- | --- | --- | --- | --- | --- | --- |
| Comments | no gel | no gel | no gel | exotherm during the addition of aminosilane | no gel c | no gel |
| Pourability | non-flowing | non-flowing | non-flowing | non-flowing | non-flowing | NM |
| Skin time (min)T$_{20}$ | 10 | 10 | 10 | 15 | 15 | NM |
| Skin time (min)T$_{100}$ | 15 | 15 | 15 | 20 | NM | NM |
| SAH T$_{20}$ after 48/72 h crosslinking | 26/30 | 25/29 | 13/18 | 5/14 | NM | NM |
| SAH T$_{100}$ after 48/72 h crosslinking | 16/22 | 18/24 | 8/15 | 7/18 | NM | NM |
| TS T$_{20}$ | 0.97 | 1.10 | 0.95 | 0.67 | NM | NM |
| TS T$_{100}$ | 1.17 | 1.13 | 0.93 | 0.96 | NM | NM |
| EB T$_{20}$ | 267 | 352 | 405 | 356 | NM | NM |
| EB T$_{100}$ | 485 | 475 | 363 | 508 | NM | NM |

What is claimed is:

1. A process for the preparation of a linear diorganopolysiloxane having at least two alkoxy groups at each end of the polymer chain, comprising reacting at least one linear diorganopolysiloxane having a hydroxyl group at each end of the polymer chain with at least one polyalkoxysilane of the formula:

$$(R^1)_a(OR^6)_b Si(OR^2)_{4-a-b} \quad (3)$$

in the presence of a catalytically effective amount of a zinc complex of the formula:

$$ZnQ_2 \quad (4)$$

wherein said formulae (3) and (4), a is 0 or 1; b is 0, 1 or 2; $R^1$ is a substituted or unsubstituted, saturated or unsaturated $C_1$–$C_{13}$ monovalent hydrocarbon radical; $R^2$ is an organohydrocarbon radical having up to 13 carbon atoms; $R^6$ is a radical $R^2$ or an organohydrocarbon radical having fewer carbon atoms than $R^2$; and Q is a monovalent anion of the formula

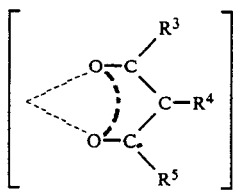

in which $R^3$ and $R^5$, which may be identical or different, are each a hydrogen atom, a $C_1$–$C_{12}$ alkyl radical or halogenated such radical, a $C_2$–$C_8$ alkenyl radical or halogenated such radical, a $C_4$–$C_8$ cycloalkyl radical or halogenated such radical, a $C_6$–$C_{10}$ mononuclear aryl radical or halogenated such radical, a $C_7$–$C_{12}$ mononuclear arylalkly radical or halogenated such radical, a $C_1$–$C_5$ alkoxy radical or halogenated such radical, a $C_1$–$C_6$ acyloxy radical, a cyanoalkyl radical having a $C_1$–$C_4$ alkyl moiety, or a cyanoalkoxy radical having a $C_1$–5 alkoxy moiety; and $R^4$ is a hydrogen atom, a $C_1$–$C_8$ hydrocarbon radical or halogenated such radical, with the proviso that $R^4$ and $R^5$ may together form a $C_5$–$C_{12}$ cyclic hydrocarbon radical or a substituted such radical bearing one or more chloro, nitro and/or cyano substituents.

2. The process as defined by claim 1, wherein said formulae (3) and (5), $R^2$ is an alkyl, alkylether, alkyl ester, alkyl ketone or alkylcyano radical having from 1 to 8 carbon atoms or an aralkyl radical having from 7 to 13 carbon atoms; and $R^4$ is an alkyl, alkenyl or mononuclear aryl radical or halogenated such radical.

3. The process as defined by claim 1, said linear diorganopolysiloxane having at least two alkoxy groups at each end of the polymer chain having the formula:

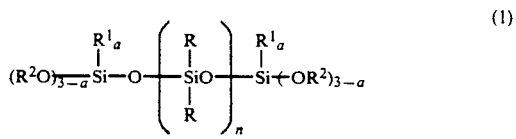

and said linear diorganopolysiloxane having a hydroxyl group at each end of the polymer chain having the formula:

in which $R^1$ and $R^2$ are as defined in claim 1; the radicals R, which may be identical or different, are each a monovalent hydrocarbon radical containing from 1 to 10 carbon atoms or a substituted such radical bearing one or more halogen and/or cyano substituents; a is 0 or 1 and n is a number of such value as to provide the diorganopolysiloxanes of formulae (1) and (2) with a viscosity of 25 to 1,000,000 mPa.s at 25° C.

4. The process as defined by claim 3, comprising reacting 1 to 5 moles of the polyalkoxysilane of formula (3) per 1 mole of ≡SiOH groups of the linear polysiloxane of formula (2).

5. The process as defined by claim 4, comprising reacting 2 to 4.8 moles of the polyalkoxysilane of formula (3).

6. The process as defined by claim 3, wherein said formulae (1) and (2), R is a methyl, phenyl, vinyl or 3,3,3-trifluoropropyl radical.

7. The process as defined by claim 1, said polyalkoxysilane of the formula (3) comprising methyltrimethoxysilane, tetraethoxysilane or methoxytriethoxysilane.

8. The process as defined by claim 1, said catalyst of the formula (4) comprising zinc bisacetylacetonate, bis(1,3-diphenyl-1,3-propanedione)zinc or bis(1-phenyl-5-methyl-1,3-hexanedione)zinc.

9. The process as defined by claim 3, comprising heating said dihydroxydiorganopolysiloxane of formula (2) to a temperature of less than 140° C., under an inert atmosphere and with stirring, next adding said polyalkoxysilane of formula (3) and catalyst of formula (4) thereto, and maintaining such temperature and stirring for a period of time of less than 2 hours.

10. A CVE polysiloxane composition of matter, storage-stable in the absence of moisture and curable into elastomeric state in the presence thereof, said CVE composition comprising the linear diorganopolysiloxane having at least two alkoxy groups at each end of the polymer chain obtained after having carried out the process according to claim 9.

* * * * *